United States Patent [19]
Weigand et al.

[11] Patent Number: 5,415,256
[45] Date of Patent: May 16, 1995

[54] FRICTION TYPE TORQUE-LIMITING CLUTCH BRAKE WHICH SPLITS INTO HALVES FOR EASY REPLACEMENT

[75] Inventors: Peter J. Weigand, Glenview; William A. Smith, Hoffman Estates; Thomas A. Kay, Jr., Schaumburg; Hugh R. Harris, Libertyville, all of Ill.

[73] Assignee: Diebel Manufacturing Co., Morton Grove, Ill.

[21] Appl. No.: 134,931

[22] Filed: Oct. 12, 1993

[51] Int. Cl.⁶ .............................................. F16D 67/02
[52] U.S. Cl. .................. 192/13 R; 192/56 R; 192/DIG. 1; 464/30
[58] Field of Search ............ 192/13 R, 56 R, DIG. 1, 192/70.13; 464/30

[56] References Cited
U.S. PATENT DOCUMENTS

| | | |
|---|---|---|
| 1,855,899 | 4/1932 | Barclay . |
| 2,117,728 | 5/1938 | Katcher . |
| 2,264,192 | 11/1941 | Wellman . |
| 2,637,987 | 5/1953 | Hill et al. . |
| 3,016,119 | 1/1962 | Rosenberger et al. . |
| 3,745,790 | 7/1973 | Ryan . |
| 3,763,977 | 10/1973 | Sink . |
| 4,043,437 | 8/1977 | Taylor . |
| 4,186,826 | 2/1980 | MacKendrick et al. . |
| 4,512,450 | 4/1985 | Babcock . |
| 4,762,215 | 8/1988 | Flotow et al. . |
| 4,807,730 | 2/1989 | Kitano et al. . |
| 4,919,243 | 4/1990 | Flotow ............................ 192/13 R X |
| 4,947,969 | 8/1990 | Tarlton, Sr. ......................... 192/13 R |
| 5,000,721 | 3/1991 | Williams . |
| 5,031,739 | 7/1991 | Flotow et al. ....................... 192/13 R |
| 5,099,970 | 3/1992 | Harris ................................. 192/13 R |
| 5,285,881 | 2/1994 | Lero et al. .......................... 192/13 R |

*Primary Examiner*—Andrea L. Pitts
*Attorney, Agent, or Firm*—Cook, Egan, McFarron & Manzo

[57] ABSTRACT

A torque-limiting clutch brake is provided that has an inner collar which splines to a transmission gearbox input shaft. An intermediate coupling member fits around and engages the inner collar. A friction generating resilient wave washer is disposed between the intermediate coupling member and an outer housing. The outer housing includes two covers, within which the components are contained and the resilient wave washer is partially compressed. Friction generated by the resilient wave washer conditionally couples the outer housing to the intermediate coupling member and inner collar until torque on the device exceeds a certain threshold, at which point the clutch brake slips to prevent damage. The components are made up of separable semicircular sections which can be split apart to facilitate removal and installation of the clutch brake without lowering and disassembling the vehicle transmission. The outer housing is hinged at one end and has a clamping bolt at the other end for securing the unit around a gear box input shaft.

11 Claims, 2 Drawing Sheets

FRICTION TYPE TORQUE-LIMITING CLUTCH BRAKE WHICH SPLITS INTO HALVES FOR EASY REPLACEMENT

BACKGROUND OF THE INVENTION

The present invention relates to heavy-duty friction clutches of the type used for large automotive vehicles such as trucks, tractor-trailers, and the like and, more particularly, to a torque-limiting clutch brake assembly.

The use and function of a clutch brake are well known in the art, as discussed, for example, by Flowtow et al. (U.S. Pat. No. 4,762,215) and Babcock (U.S. Pat. No. 4,512,450). A clutch brake is a device used to facilitate shifting by retarding the rotation of transmission gears when the clutch is disengaged by the vehicle operator. Typically, a clutch brake is a disk-shaped device which is splined to the gearbox input or drive shaft of a transmission and is activated by a throw-out mechanism when the clutch is disengaged. The spinning clutch brake is thereby sandwiched between the throw-out mechanism and gearbox housing, creating a frictional drag or braking effect to slow rotation of the input shaft.

In normal use a clutch brake eventually wears out and must be replaced. This typically requires lowering and disassembling the vehicle transmission, which is a time consuming and expensive procedure. However, Babcock (U.S. Pat. No. 4,512,450) discloses a design in which the clutch brake splits into halves so that it can be replaced without extensive disassembly of the transmission. This greatly reduces the cost of replacement.

Torque-limiting designs take a different approach. They reduce the frequency of replacement necessary by improving clutch brake longevity. They accomplish this by permitting the clutch brake to slip when excessive braking pressure is applied, thereby avoiding the excessive stresses which contribute to wear and tear. Also, unlike traditional designs, a torque-limiting clutch brake will not disrupt vehicle operation when improperly applied. Flowtow et al. (U.S. Pat. No. 4,762,215, incorporated herein by reference), for example, teaches the use of a particular friction coupling between an outer housing and inner collar member. When the torsional force between the housing and collar is too great, they slip relative to each other and thereby avoid damage.

While such torque-limiting designs work relatively well for their intended purpose, the clutch brake still eventually fails and must be replaced. However, Flowtow et al. does not teach or suggest a torque-limiting clutch brake design which splits into halves, and so it must be replaced by lowering and disassembling the clutch and transmission. Furthermore, the components used in prior art friction type torque-limiting mechanisms must be of constant dimension and have no discontinuities in order to maintain a constant slip torque. Hence, until now it has been generally thought that these designs cannot be made into splittable sections because such sections will typically have discontinuities and jam or otherwise work improperly upon use.

The present inventor's U.S. Pat. No. 5,099,970, entitled "Torque-Limiting Clutch Brake Assembly" (incorporated herein by reference) discloses a splittable, torque-limiting clutch brake which utilizes a detent mechanism as the torque-limiting feature, instead of a friction type mechanism. Use of the detent mechanism facilitates making the device in splittable halves which can be installed without removing the clutch and transmission from the vehicle.

The present invention, however, provides a friction type torque-limiting clutch brake which is also splittable into halves for easy removal and installation. It successfully overcomes the inherent difficulties in making a multi-piece friction type design in splittable halves. Moreover, the present invention uses a hinge to join one end of the two halves together in order to further facilitate installation.

Accordingly, it is a principle object of the present invention to provide an effective, long-lasting, torque-limiting clutch brake which can be removed and installed without disassembling the transmission.

More particularly, it is an object to provide a friction type torque-limiting clutch brake which can be split into halves and assembled back together.

A related object is to provide a friction type torque-limiting mechanism which is capable of being made in separable halves without jamming upon use.

A further object is to provide a torque-limiting clutch brake which can be installed with one hand through a relatively small opening.

SUMMARY OF THE INVENTION

These objects, as well as others that will become apparent upon reference to the accompanying drawings and following detailed description, are provided by a clutch brake which has a frictional torque-limiting mechanism and which splits into sections for convenient removal and installation.

In the preferred embodiment of the present invention, an annular inner collar member fits around and engages a transmission gearbox input shaft and includes two semicircular sections. An intermediate coupling member, also formed of two semicircular sections, fits around and engages the inner collar such that rotational torque is transmitted between the inner collar and intermediate coupling member.

A friction type torque-limiting mechanism is formed of two generally semicircular resilient wave washer sections. The ends of each wave washer section have retaining tabs which are retained in slots in the clutch brake's outer housing so that the wave washers cannot slip and jam when torque is applied to the clutch brake.

The outer housing is formed by two annular covers which also split into semicircular sections, and which apply radially inward force against the resilient wave washer sections so as to flatten them out. The resilient wave washer sections seek their original wave shape, and thereby generate substantial friction between the wave washer sections, intermediate coupling member, and the outer housing covers. This friction conditionally couples the outer housing to the wave washer sections, and ultimately to the intermediate coupling member and the inner collar. However, when torque on the clutch brake exceeds a certain level, friction is overcome and the clutch brake housing slips relative to the wave washer sections, the intermediate coupling member, and the inner collar—thereby preventing damage to the clutch brake.

Since all of the clutch brake components split into halves, the entire clutch brake unit can be removed and installed around a gearbox input shaft without disassembling the vehicle clutch and transmission. Further, the outer housing of the two clutch brake halves is joined together at one end by a hinge so that the two halves can be easily placed around the input shaft with one hand through a relatively small opening and then swung together around the shaft. The halves are then secured together at the other end by a clamping bolt assembly.

BRIEF DESCRIPTION OF THE DRAWINGS

In describing the preferred embodiment, reference is made to the accompanying drawings wherein.

DETAILED DESCRIPTION OF THE PREFERRED EMBODIMENT

Figure 1:
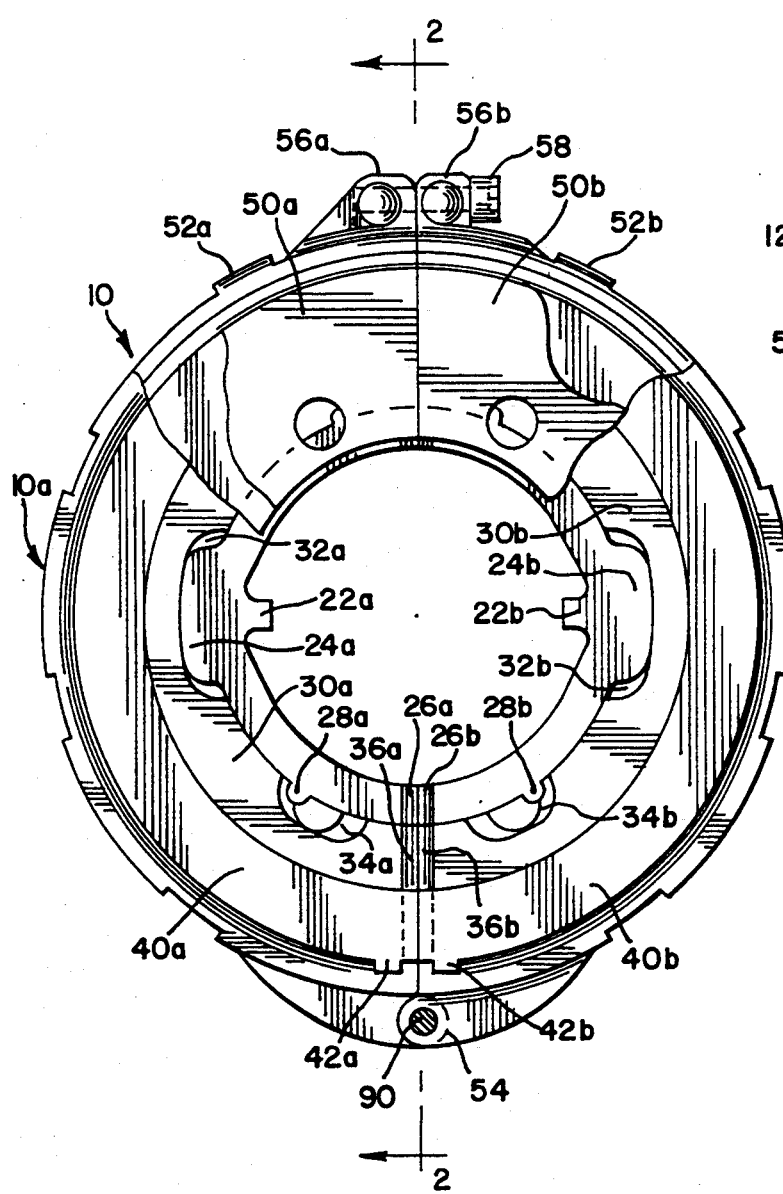
FIG. 1 is a plan view of a torque-limiting clutch brake assembly according to the present invention with portions broken away to show detail.

Turning to the figures of the drawings, there is seen in FIG. 1 a clutch brake assembly, generally indicated by 10, which is both torque-limiting and conveniently replaceable.

The clutch brake assembly 10 can be described generally as having two splittable halves, indicated as 10a and 10b in FIG. 1. As best seen in JIG. 3, the clutch brake is made up of a plurality of generally annular, ring-shaped members, all of which are preferably made up of two half-ring or semicircular sections. This sectional design allows the brake to be split into halves for convenient removal and replacement.

The innermost component of the assembly is the inner collar 20 and includes two semicircular half sections 20a, 20b, each of which has an inwardly projecting tang 22a, 22b. The tangs 22a, 22b form splines that cooperate with keyways on a gearbox input shaft 12 so that rotation of the input shaft drivingly rotates inner collar 20. Each semicircular section 20a, 20b of inner collar 20 includes a lug 24a, 24b and two smaller ears 28a, 28b extending radially from the outer circumferential edge.

An intermediate coupling member 30, which also has two semicircular half sections 30a, 30b, fits around and engages inner collar 20. Each half section 30a, 30b of the intermediate coupling member 30 has a recess 32a, 32b which, as best seen in FIG. 1, receives the lugs 24a, 24b of the inner collar member. Recesses 32a, 32b are slightly oversized so that there is some rotational play permitted before the inner collar 20 engages the intermediate coupling member 30.

The intermediate coupling member 30 also includes four smaller indents 34a, 34b along its inner edge. These are used for both weight reduction and to receive inner collar member ears 28a, 28b. The ears 28a, 28b thus engage the intermediate coupling member indents 34a, 34b, and thereby prevent the inner collar member halves 20a, 20b from falling out of the clutch brake while the two halves 10a, 10b are separated apart when the unit is being installed into a vehicle.

Inner collar member 20 and intermediate coupling member 30 are preferably separate components to reduce transmission of the vibration load.

Figure 2:
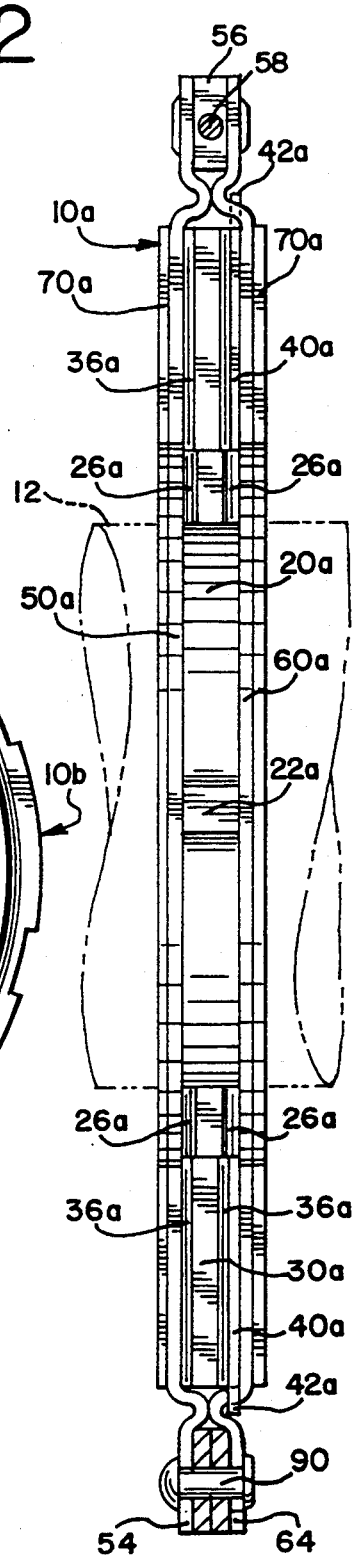
FIG. 2 is a cross-sectional view of the clutch brake assembly taken along line 2—2 in FIG. 1.
Figure 3:
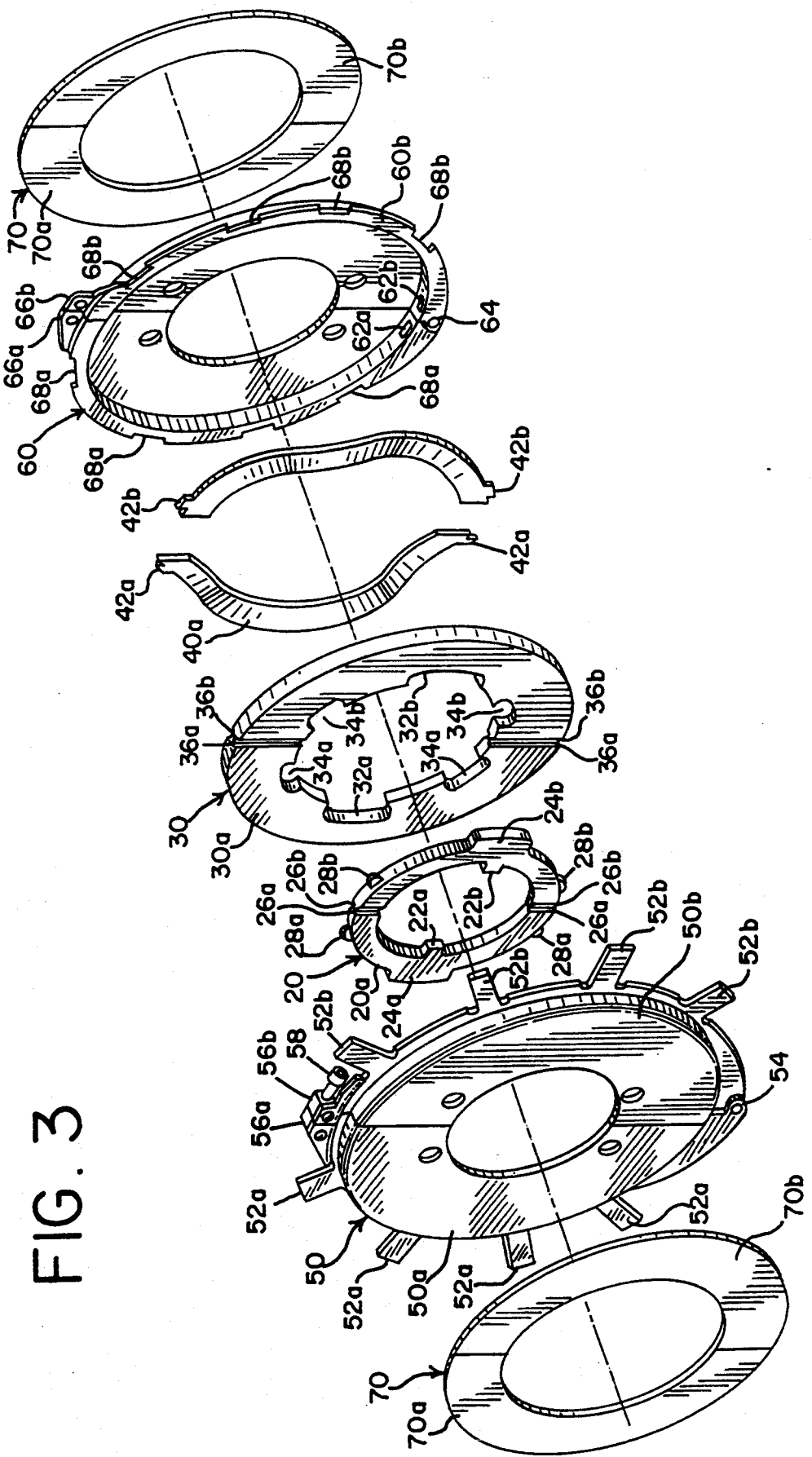
FIG. 3 is an exploded perspective view of the inventive clutch brake assembly.

As best seen in FIG. 3, a pair of semicircular wave washer sections 40a, 40b are positioned between the intermediate coupling member 30 and a first outer housing cover 60. The "waves" of the wave washer sections 40a, 40b are somewhat unique compared to what would be formed if the wave washer of Flowtow et al. (U.S. Pat. No. 4,762,215) were cut in half in that the ends of each section are inclined (in an axial direction) toward the same side of the wave washer. This helps to keep the wave washer ends even so as not to create protruding edges which can catch on the other moving components. Retaining tabs 42a, 42b are located near the ends of each wave washer section 40a, 40b and fit into corresponding slots 62a, 62b located in the first outer housing cover 60 (only the bottom two slots can be seen in FIG. 3). FIG. 2 shows a cross-section along the line 2—2 of FIG. 1 and illustrates how the retaining tabs 42a extend through slots 62a in the first outer housing cover 60a.

Also, as best seen in FIG. 3, the edges of each end of the inner collar member semicircular sections 20a, 20b have beveled portions 26a, 26b. Likewise, the ends of the intermediate coupling member sections 30a, 30b have beveled portions 36a, 36b. This beveling helps to prevent the other clutch brake components, especially the ends of the wave washer sections 40a, 40b, from snagging or catching on exposed edges when the internal components spin relative to the outer housing. Otherwise, the clutch brake may tend to jam when its torque-limiting function operates.

A second outer housing cover 50 has a plurality of fastening tabs 52a, 52b around its outer circumference which correspond to a plurality of fastening notches 68a, 68b along the outer circumference of the first outer housing cover 60. In FIG. 3 the fastening tabs 52a, 52b are shown extending radially. However, when the clutch brake is assembled, the fastening tabs 52a, 52b are bent over onto cover 60 so as to secure the two housing covers 50, 60 together, as in FIG. 1. Also, both outer housing covers 50, 60 are split into semicircular sections 50a, 50b and 60a, 60b, respectively.

The clutch brake components are assembled and compressed together within the outer housing covers 50, 60, such that the resilient wave washer sections 40a, 40b are compressed and partially flattened out. The resiliency of the wave washer sections maintains a substantial pressure between the intermediate coupling member 30 and the two outer housing covers 50, 60, thus generating a frictional resistance to rotation of the intermediate coupling member 30 relative to the outer housing.

When the wave washer sections 40a, 40b are compressed they increase in length slightly. Accordingly, the retaining slots 62a, 62b are sized to have sufficient clearance so that the wave washer retaining tabs 42a, 42b will have room when the wave washer sections 40a, 40b are compressed.

Both housing covers 50 and 60 have friction facings 70 glued to their outer surfaces. These friction facings are also in the form of semicircular sections 70a, 70b to match the outer housing cover sections 50a, 50b and 60a, 60b.

As best seen in FIG. 3, the two semicircular sections of each of the outer housing covers 50 and 60 have hinge portions 54 and 64, respectively, which join the sections together. When the clutch brake is assembled the hinge portions 54, 64 are hingedly secured by a rivet 90, as best seen in cross section in FIG. 2. This allows the two clutch brake assembly halves 10a, 10b to be easily swung apart and together to facilitate installation of the clutch brake around a gearbox input shaft 12 with one hand through a restricted opening, as is often required.

As best seen in FIG. 3, a clamping assembly 56a, 56b is shown attached to a flange extending from the second outer housing cover 50 at the end opposite the hinge portion 54. The first outer housing cover sections 60a, 60b each have a flange 66a, 66b corresponding to the clamping assembly 56a, 56b with holes, as best seen in FIG. 3, for riveting to the clamping assembly. A clamping bolt 58 extends through the clamping assembly 56b on the outer housing cover 50b, and screws into threads of the clamping assembly 56a on the adjacent cover section 50a. This allows the two halves of the clutch brake to be securely fastened together, as best seen in FIG. 1.

When installed around a gearbox input shaft 12 with the clutch and transmission in place in a vehicle (not shown), the clutch brake assembly 10 described above operates in generally the same manner as other clutch brakes. When the driver of the vehicle depresses the clutch pedal a certain distance, the clutch brake assembly is forced against the gearbox housing so that a frictional torsion force is developed and transmitted from the outer housing covers 50 and 60 through the intermediate coupling member 30 to the inner collar 20, which thereby brakes the rotating input shaft 12.

However, if torque on the clutch brake assembly becomes excessive, the frictional resistance generated by pressure from the resilient wave washer sections is overcome and the intermediate coupling member 30 and inner collar 20 can then spin independent of the clutch brake outer housing—thereby relieving the excessive torsional stress on the clutch brake. The intermediate coupling member 30 and inner collar 20 will slip until torque on the clutch brake assembly is reduced to the point where the frictional resistance within the clutch brake again exceeds the external torque.

When the clutch brake according to the present invention eventually does wear out, it can be replaced at a substantial savings in cost over other torque-limiting clutch brakes because it is not necessary to lower and disassemble the transmission. Moreover, the fact that the two halves of the clutch brake are hinged together further facilitates installation.

From the foregoing, it can be seen that a torque-limiting clutch brake for facilitating the shifting of gears in a vehicle having a friction clutch has been provided which fully meets the objects of the instant invention. While the device has been described in the terms of a preferred embodiment, there is no intent to limit the invention to the same. On the contrary, it is intended to cover all modifications and equivalents within the scope of the appended claims. Moreover, it should be emphasized that many variations within the scope of the present invention will be apparent to one skilled in the art. For example, the semicircular sections described in the preferred embodiment could have a wide range of generally crescent-like or semicircular shapes. Also, other suitable friction generating resilient members could be used, such as helical springs with friction pads; and the resilient members could be positioned so that friction would be generated along the outer radial edge of the intermediate coupling member, rather than on its side surfaces.

What is claimed is:

1. A torque-limiting clutch brake assembly which mounts around a transmission gearbox input shaft, comprising:

a generally annular inner collar member which positively engages the transmission gearbox input shaft;
an intermediate coupling member disposed around said inner collar member, said intermediate coupling member positively engaging said inner collar member;
an annular outer housing containing said inner collar member and intermediate coupling member;
a friction generating resilient member disposed between said outer housing and said intermediate coupling member, said resilient member being partially compressed and generating a fictional force between said outer housing and said intermediate coupling member to conditionally engage said intermediate coupling member and said inner collar when torque on the clutch brake is below a predetermined force, while rotatably releasing said intermediate coupling member and said inner collar member when torque on the clutch brake exceeds said predetermined force; and
wherein said annular inner collar member, intermediate coupling member, and annular outer housing each include first and second separable crescent shaped sections.

2. The clutch brake assembly of claim 1, wherein said inner collar member comprises two semicircular sections, each section having two ends and substantially flat opposite side surfaces, and wherein the edges of the ends of the semicircular sections are beveled along the side surfaces to help prevent other components of the clutch brake from snagging on the edges.

3. The clutch brake assembly of claim 1, wherein said intermediate coupling member comprises two semicircular sections, each section having two ends and substantially flat opposite side surfaces, and wherein the edges of the ends are beveled along the side surfaces to help prevent other components of the clutch brake from snagging on the edges.

4. The clutch brake assembly of claim 2, wherein each said semicircular section includes a pair of retaining ears along the outer circumferential edge which engage the intermediate coupling member to prevent the semicircular sections from falling out of the clutch brake during assembly.

5. The clutch brake assembly of claim 1, wherein said friction generating resilient member comprises a resilient wave washer.

6. The assembly of claim 5, wherein said resilient wave washer includes two generally semicircular sections having radially outwardly extending tabs which engage the outer housing.

7. The assembly of claim 6, wherein the shape of the waves of said wave washer sections is such that the ends of said wave washer sections are inclined in an axial direction toward the same side of the clutch brake.

8. The clutch brake assembly of claim 1, wherein said first and second sections of said outer housing are joined at one end by a hinge to facilitate installation of the clutch brake around a gear box input shaft.

9. The assembly of claim 8, further including a clamping bolt assembly at the end opposite said hinge to securely fasten said first and second outer housing cover sections together.

10. The clutch brake assembly of claim 1, further including friction facings secured to the exterior faces of said first and second outer housing covers.

11. A torque-limiting clutch brake assembly comprising, in combination:

an annular inner collar including first and second sections, said first and second sections being substantially flat and each section being generally semicircularly shaped, said first and second sections including radially inwardly projecting tangs on their inner circumferential edges and radially outwardly projecting lugs on their outer circumferential edges;

an annular intermediate coupling member including first and second sections, said first and second sections being substantially flat and each section being generally semicircularly shaped, the inner circumference of said annular coupling member being sized to fit around the outer circumference of said annular inner collar and having recesses that receive the lugs of said inner collar and thereby positively engage said inner collar;

a friction generating resilient wave washer including first and second semicircularly shaped sections disposed on the flat surface of said intermediate coupling member;

first and second annular covers each including first and second sections, each of said first and second sections being generally semicircularly shaped and having two ends, said first and second annular covers defining a chamber of sufficient size to house said annular inner collar, said annular intermediate coupling member, and said resilient wave washer; and a hinge joining one end of said first and second sections of said first and second annular covers together and a clamping bolt assembly to secure the other end of said first and second sections of said first and second annular covers together.

* * * * *